United States Patent [19]
Daly

[11] Patent Number: 5,199,168
[45] Date of Patent: Apr. 6, 1993

[54] NON-SLIP TACHOMETER ROLLER
[75] Inventor: Keith L. Daly, Clinton, Mass.
[73] Assignee: Digital Equipment Corporation, Maynard, Mass.
[21] Appl. No.: 770,603
[22] Filed: Oct. 3, 1991

Related U.S. Application Data

[62] Division of Ser. No. 620,465, Nov. 29, 1990, Pat. No. 5,088,172.

[51] Int. Cl.$^5$ .......................... B21H 1/14; B21K 1/02
[52] U.S. Cl. ..................................... 29/895.3; 492/35
[58] Field of Search ............. 29/895.3, 895.31, 895.33, 29/121.1, 121.4

[56] References Cited
U.S. PATENT DOCUMENTS

| | | | |
|---|---|---|---|
| 3,037,290 | 6/1962 | Dolby | 29/121.4 |
| 3,066,067 | 11/1962 | Burgess, Jr. et al. | 29/121.4 X |
| 3,374,648 | 3/1968 | Maguire | 29/121.4 X |
| 4,159,633 | 7/1979 | Linne | 29/895.3 X |
| 4,192,050 | 3/1980 | Appenzeller | 29/121.4 X |

Primary Examiner—Timothy V. Eley
Assistant Examiner—C. Richard Martin
Attorney, Agent, or Firm—Ronald E. Myrick; Barry N. Young; Ronald C. Hudgens

[57] ABSTRACT

A method of forming a tachometer roller for a tape drive assembly for detecting the speed of a tape moving along a reference axis when the tape is in contact with the roller. The roller includes a cylinder extending in a longitudinal axis and adapted to be fixed in a tape drive assembly for rotation along the reference axis. The periphery of the cylinder defines an air vent groove running obliquely to the longitudinal axis for venting of air captured between the periphery and the tape. The vent groove terminates in respective circumferential grooves formed in respective edge portions of the roller. The vent groove is formed from a single plunge cut of a tool starting at a first circumferential groove and terminating at the other circumferential groove.

3 Claims, 4 Drawing Sheets

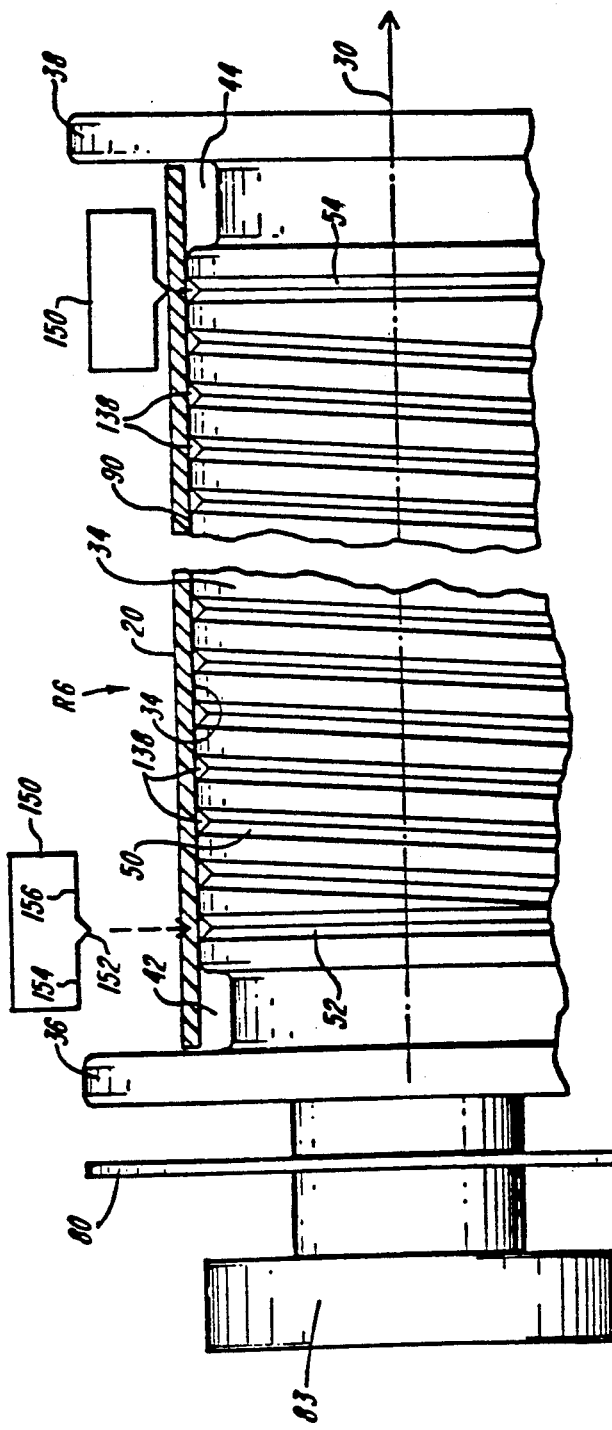

NON-SLIP TACHOMETER ROLLER

This is a divisional application of U.S. Ser. No. 07/620,465, filed Nov. 29, 1990, now U.S. Pat. No. 5,088,172.

BACKGROUND OF THE INVENTION

The present invention relates to magnetic tape drive systems, and more particularly, to a non-slip tachometer roller for use in a magnetic tape drive assembly.

Magnetic storage disks, commonly referred to as hard disks, are presently a preferred storage medium for computer systems where short access time and good storage capacity are of interest. But magnetic storage tapes are commonly used because of their low cost, portability and adequate storage capacity. Contrary to hard disks, which generally remain inaccessible within the disk drive assembly, the tape in its removable container (called a cartridge) can be more economically transported to remote locations.

A typical magnetic tape includes a mylar substrate, having a coating of magnetic recording material on one side and a non-stick "back coating" on the other side of the mylar. The magnetic recording material is sensitive to magnetic fields generated by a magnetic read/write head located in the computer tape drive assembly. The magnetic fields from the head represent information to be stored as data in tracks on the tape, and cause changes (i.e., transitions) in the magnetic (i.e., dipole) orientation of the magnetic material on the tape. The head in turn reads the fields of the stored transitions in a given track on the tape and generates a readback signal representative of these transitions for later decoding in order to retrieve stored data.

In order to increase storage density for a given cartridge size, thinner tape may be employed so as to put more tape on the supply reel. Also, data may be written on the tape in any one of a plurality of parallel longitudinal tracks as the tape streams by the head along a longitudinal tape path. If the data portion of the tape puckers, is warped or otherwise is not essentially planar as it contacts the sensing portion of the head, then data retrieval errors are likely to result. These errors are commonly referred to as "drop-outs", since the data on the deformed part of the tape drops out of the retrieved data.

The tape runs between a supply reel in the tape cartridge and a takeup reel in the computer's tape drive assembly, and must be maintained at a constant speed as it streams across the magnetic head during reading or writing to avoid data errors. A drive motor typically is associated with each reel, and is driven under control of a motor controller circuit which receives information from a tachometer coupled to a roller, with the roller placed in the tape travel path. The tape streaming across the roller surface rotates the roller which motion is sensed by the tachometer. The tachometer then generates a control signal assumed to be representative of tape speed, and the control signal is employed by the motor controller circuit to regulate the speed of the drive motors and hence tape speed. In this manner tape speed is servoed at or about a desired operating point.

However, if the tape slips on the tachometer roller, then an incorrect (low) tape speed signal will be generated by the tachometer, because the tape will be moving faster than the roller. This slippage error in the tape speed signal, i.e., the disparity between tape and roller speed, is problematic. The motor controller will accelerate the drive motors in response to the incorrectly low tape speed signal, and so the tape will be accelerated. This acceleration will further increase the slippage error between tape and roller since the roller is even less likely to capture the tape at higher tape speed. Hence this slippage error continues to increase each time the motor controller updates its motor drive output based on the erroneous tape speed signal. This leads to a "runaway" condition and will cause a system shutdown. Tape slippage can also cause difficulty in location of data on the tape.

Tape slippage in part is attributed to a thin film of air which flows between the streaming tape and the roller. The air film lifts the tape off of the roller, sufficiently to cause an incorrect tape speed indication as the tachometer roller fails to turn at the same rate as the tape is moving. It is therefore necessary to vent the air film between the tachometer roller and the streaming tape in order to reduce slippage between the roller and tape.

While having a plurality of radial grooves on the tachometer roller periphery might be employed for venting of the air film between the tape and roller, very thin tape tends to cave into the grooves, which deforms the tape. If these deformations occur along a data track, which is likely when using a roller with a multiplicity of radial grooves and a thin multi-track tape, then data dropouts are likely to occur. Therefore, it has been found that for particularly thin magnetic recording tape, such as tape having 0.0005 inch (i.e., half mil) thickness, it is not practical to employ a multiplicity of radial grooves on a tachometer roller for venting of the air film. Furthermore, the many tool plunges required to cut a multiplicity of radial grooves increases tooling expenses and raises quality control problems as burrs are often formed during the tool plunging process These burrs will damage the tape and therefore must be removed by polishing during manufacture.

It is therefore an object of the present invention to provide a high density tape drive which provides an accurate indication of tape speed.

It is another object of the present invention to provide a non-slip tachometer roller for use in a high density tape drive.

It is a further object of the present invention to a provide tachometer roller for use with thin magnetic tapes, the roller having improved traction while maintaining tape integrity.

It is another object of the present invention to provide a high yield and cost-effective method for forming a non-slip tachometer roller for use with thin magnetic tapes.

SUMMARY OF THE INVENTION

The present invention provides a tachometer roller with a tape contacting surface configured to minimize slippage between the roller and tape. In a preferred embodiment of the invention, a continuous helical thread groove running obliquely to the tape travel direction is formed on the tachometer roller tape contacting surface. The groove vents the air film between the tape and roller surface. With the air film vented, the tachometer roller and the tape riding on the tachometer roller travel essentially at the same rate, thus enabling an accurate tachometer indication of tape speed and avoiding tape runaway. The oblique orientation of the groove mitigates the deformation that the groove imparts upon the tape, thus minimizing dropouts. The grooves are preferably small (i.e., microgrooves) and generally triangular in cross-section.

The helical thread groove design inherently avoids formation of raised defects on the roller surface during the manufacturing process. In a preferred manufacturing method, the thread groove is terminated by a respective radial groove at each of the thread groove's ends. The groove is formed with a tool which makes a single entry into and single exit out of the roller periphery, first forming a first of the terminating radial grooves, then moving longitudinally along the turning roller periphery to form the thread groove, then forming the second terminating radial groove, and then exiting the roller periphery.

Therefore, the present invention solves the problem of tape runaway caused by the air film captured between a tape and tachometer roller, solves the problem of using roller surface venting while minimizing the deformations which such venting causes in the tape, and also solves the manufacturing and quality control problems associated with cutting grooves in a precision roller.

BRIEF DESCRIPTION OF THE DRAWINGS

These and other features and advantages of the present invention will be more fully understood by reference to the following detailed description in conjunction with the attached drawing in which like reference numerals refer to like elements and in which:

FIG. 3 is a partial side cross-sectional view of a tachometer roller assembly in practice of the invention.

FIG. 4 is a schematic presentation of an air film drawn in between a roller and tape.

DETAILED DESCRIPTION OF THE PREFERRED EMBODIMENT

Figure 1:
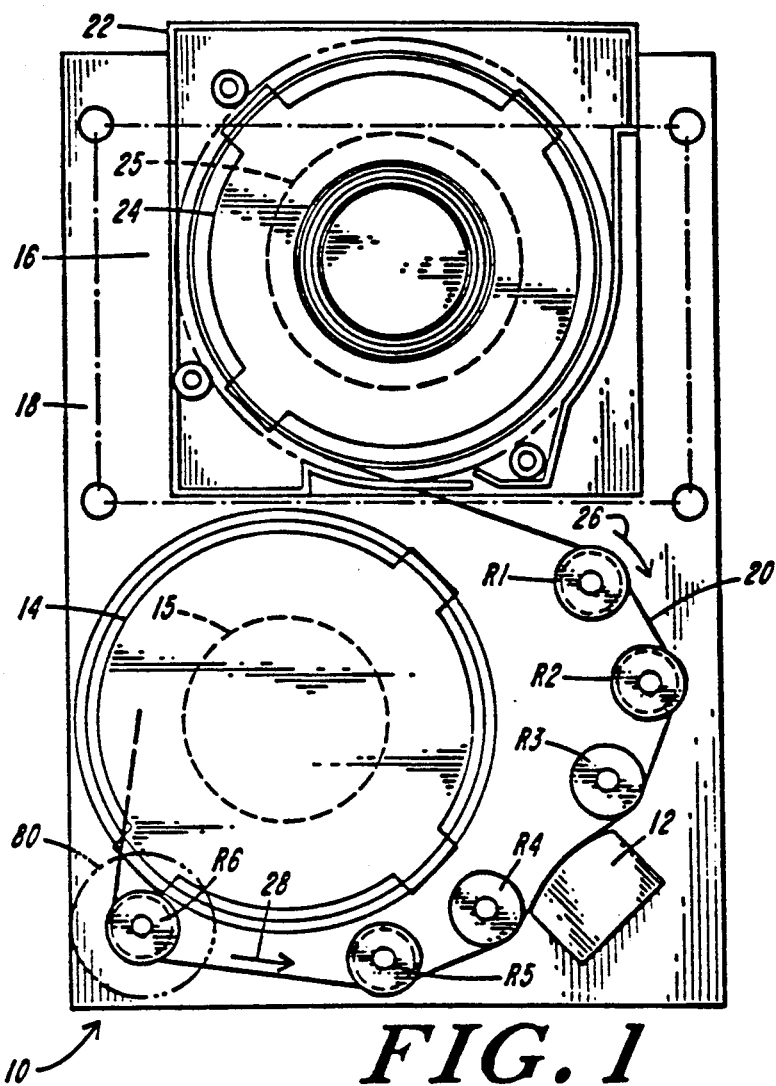
FIG. 1 is a plan view of a tape guide assembly.

A tape drive assembly 10 is shown in FIG. 1 including a tape head 12, a motorized takeup reel 14 and associated motor 15, and a tape cartridge receiver 16, all mounted in a housing 18. Tape 20 is provided to tape drive assembly 10 by insertion of cartridge 22 in receiver 16; the tape spools off of cartridge supply reel 24 with the tape leader being wound onto takeup reel 14. Receiver 16 includes a motor 25 which drives supply reel 24. The motors associated with reels 14, 24 are driven by a motor control circuit.

It is necessary to constrain the tape from lateral (up and down) movement as it traverses the face 12a of the magnetic head so as to keep the transducing portion of the head aligned with the data tracks on the tape. In a preferred embodiment of the invention, a series of six tape guiding rollers are used to constrain 0.5 inch by 0.0005 inch tape, and these rollers are shown in FIG. 1 as rollers R1-R6.

The tape path runs longitudinally from the supply reel 24, across the outside face of each of rollers R1-R3, across the head transducing face 12a, along the outside face of each of rollers R4-R6, and to takeup reel 14. In general, the tape may be driven in either forward direction 26 or reverse direction 28 to write data or to read the written data on the tape. The tape is rewound in reverse direction 28 back onto supply reel 24 before tape 20 in tape cartridge 22 is removed from assembly 10.

Figure 2:
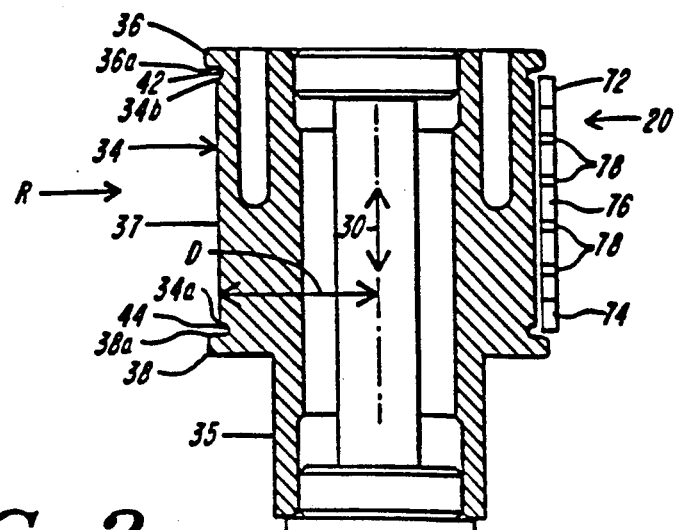
FIG. 2 is a side cross-sectional view of a tape roller.

Preferably, rollers R1-R6 are generally of like basic configuration, although one of the rollers also functions as a tachometer roller and therefore is further machined as discussed later. Essentially each tape guiding roller is a machined cylindrical shaft. An exemplary tape guiding roller R is shown in the side cross-section of FIG. 2. Roller R has a stem 35, a tape support surface 34 and flanges 36, 38. The tape support surface 34 is desired to be defect-free and uniformly flat; surface 34 extends from edge 34a to edge 34b, parallel to roller shaft axis 30. A respective gutter 42, 44 is formed as a depression between the respective inside walls 36a, 38a, of respective flanges 36, 38 and the respective support surface edges 34a, 34b. The tape support surface 34 preferably has a first diameter of 0.600 inches and stem 35 has a second (preferably smaller) diameter. The stem of each roller R1 to R5 is mounted in housing 18.

Tape guide assembly 10 and rollers R1-R6 are more particularly described in copending application Ser. No. 07/619,893, entitled "Compact Multiple Roller Tape Guide Assembly", by Andrew E. Tanzer, George Saliba, and Edward L. Steltzer, assigned to a common assignee, filed contemporaneously herewith, the contents of which are incorporated herein by reference.

In order to prevent loss of data, it is required that tape 20 be presented to the head in a generally flat condition (shown in FIG. 2) so that it uniformly interacts with the head transducing face 12a. Owing to the presence of gutters 42, 44, tape 20 is not supported adequately for recording purposes along the sides or edges of the tape. These edges are therefore relegated to being non-data portions 72, 74 of the tape. Data portion 76 of the tape lies between end portions 72, 74, and preferably lies flat on support surface 34 of the rollers. Data section 76 includes a plurality of data tracks 78.

As seen in FIG. 3, a tachometer encoder disk 80 is mounted on stem 35 of tachometer roller R6. The roller is caused to rotate in bearing 83 by the passing of tape 20 over its contact surface 34, and rotation of the roller is sensed by the tachometer encoder module 81 in cooperation with encoder disk 80, and an output is generated representative of tape speed. The tachometer module 81 output is coupled by conductors 82 to motor controller circuit 86, which in turn supplies the drive signal via respective conductors 84 to motors 15, 25 associated with reels 14, 24, respectively, to control the speed of the reels and thus to control tape speed. The roller surface is provided with a helical thread groove 50.

FIG. 4 shows the film of air 90, formed of two streams 90A, 90B, drawn in between the back coating surface 62 of tape 20 and roller surface 34 of a roller R. As seen in FIG. 3, in the present invention helical groove 50 creates a plurality of vents 138 on the roller surface 34 to vent air film 90. Formation of these grooves will now be described, after a brief review of the prior art.

Figure 5:
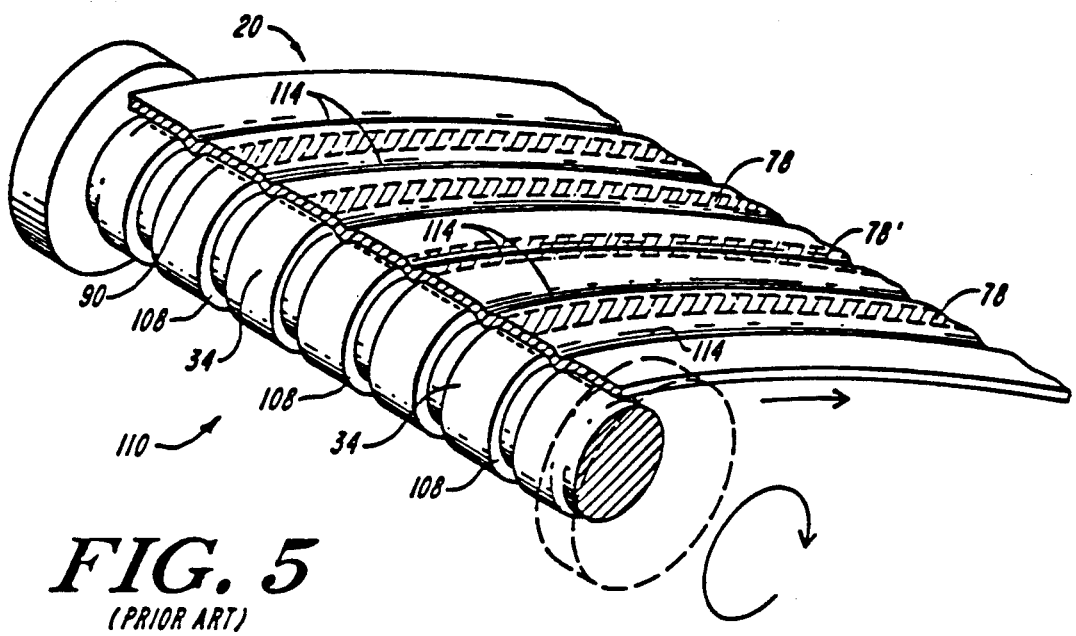
FIG. 5 is a perspective view of a tape streaming across a prior art roller with radial grooves.

As seen in FIG. 5, conventional radial grooves 108 cause the tape to deform as it passes over roller surface 34, forming damage tracks (or gullies) 114 in tape 20. Since a plurality of grooves is required to vent air film 90, the likelihood is that at least one data track 78' of data tracks 78 will be corrupted by a gully 114. Now dropouts are likely to occur when reading corrupted track 78'.

Figure 6:
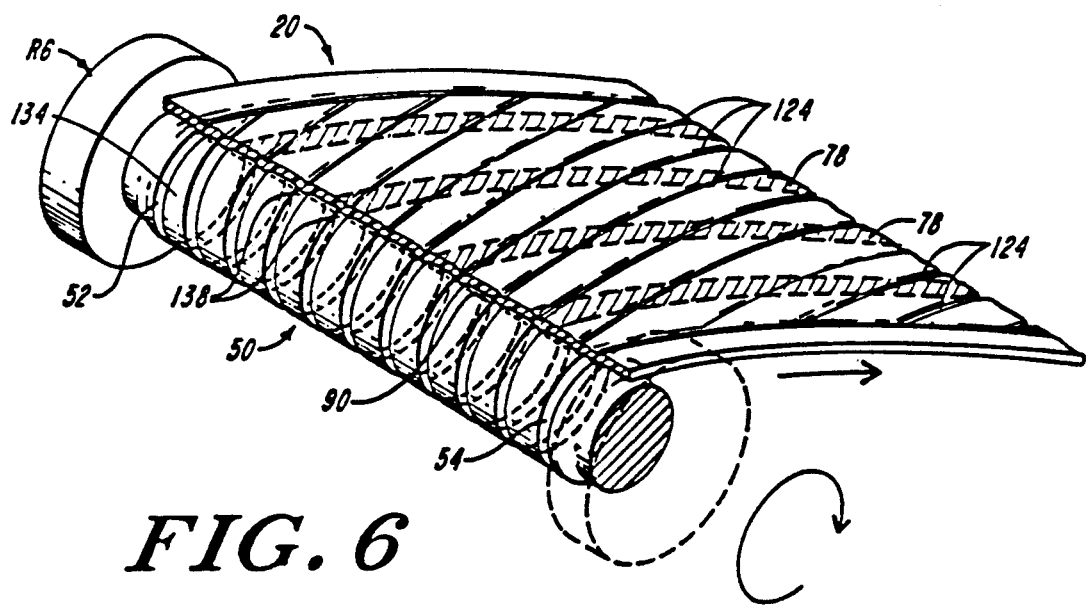
FIG. 6 is a perspective view of a tape streaming across the helical groove roller in practice of the invention.

In practice of the present invention an obliquely oriented thread groove 50 is provided on the tachometer roller. As shown in FIG. 6, the oblique angle theta of thread groove 50 causes migration of the resulting damage tracks (gullies) 124 relative to longitudinal data tracks 78. As a result of such migration dropouts are substantially reduced. The oblique threading also requires only a single plunge cut, reducing the formation of surface blemishes.

In a preferred embodiment of the present invention a single plunge of a tool 150 (shown in FIGS. 3 and 7) is made to form the helical groove's plurality of air vents 138 on the roller surface. The cutting point 152 of tool 150 is plunged into the roller adjacent to gutter 42 at the intended location on surface 34 of a first radial groove 52; the tool is held in such location for one turn of the roller (in excess of 360 degrees) to form radial groove 52 and to remove burrs created by the plunge cut. The flats 154, 156 remove debris and burrs raised during cutting.

After radial groove 52 is formed, tool 150 is driven, while still cutting into the turning roller, from groove 52 to the intended location on surface 34 of radial groove 54, thereby forming helical groove 50. When the tool cutting point 152 is at the intended location of groove 54, the tool is held in that location for slightly over one turn of the roller to form radial groove 54. Now the tool is removed from the workpiece having made only a single entry and single exit in the roller, thus limiting the possible creation of burrs or other surface defects to portions of the roller which interact with the non-data portions 72, 74 of tape 20. (If the entry and exits are desired to be made in gutters 42, 44, then a tool 150 with narrow flats 154, 156 must be employed, since the side of the flats will be driven up against the flange, unless the gutters are made wider.)

Any witness lines which may be caused by tool flats 154, 156 will be contained on the roller surface adjacent to the gutters as associated with the non-data portions 72, 74 of tape 20. Therefore, the data section 76 of tape 20 rides on that portion of roller R6 having burr-free helical groove 50. The non-data portions 72, 74 of tape 20 ride over radial grooves 52, 54 and gutters 42, 44. Therefore oblique damage trails 124 will be formed on tape 20 obliquely to data tracks 78.

It is desirable to minimize the damage which the helical thread groove imparts to the tape while maximizing the air venting capacity of the groove. The depth and width of the thread groove and the number of threads per inch, determines the volume of the groove and thus its air venting capacity. However as the width of the groove increases so increases the width of the damage track 124 on the tape. Therefore a narrow width groove is preferred, on the order of several thousandths of an inch. Furthermore, for a tool capable of cutting a groove width of a few thousandths of an inch, the achievable cutting depth is necessarily limited. Therefore, in practice of the present invention, a narrow width groove, i.e., a microgroove, is employed to minimize tape damage, albeit at reduced air venting capacity, and this reduced capacity is compensated for by increasing the number of threads per inch.

Figure 7:
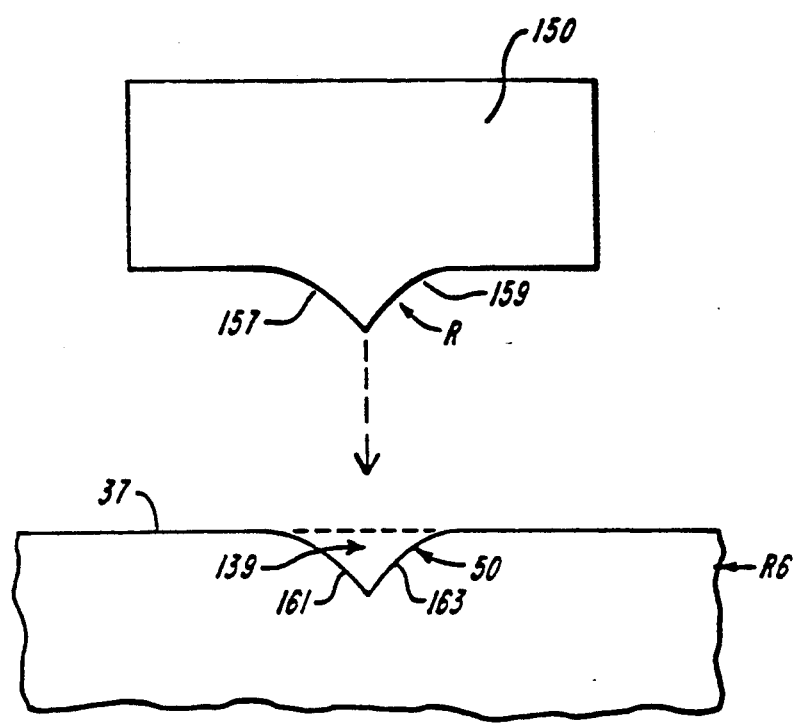
FIG. 7 is a partial view of a tool forming the helical groove of the present invention.

In one embodiment of the invention, shown in FIG. 7, a helical thread microgroove having an essentially triangular cross-section 139 is formed on roller surface 34 using a hardened steel or tool steel tool 150. The cutting point 152 is formed by the intersection of two arcs 157, 159 each having a radius of $0.002 +/- 0.001$ inches, forming a cutting point base width BW of $0.005 +/- 0.001$ inches. The approximately triangular cross-section 139 of helical thread groove 50 forms an approximate angle of 45 degrees between groove walls 161, 163. Preferably the helical thread groove is formed on a 0.600 inch diameter tachometer roller on a 66.6 thread per inch pitch (0.015 inch groove center to center).

The formed grooves may be tested for specification compliance by use of a profilometer to read the profile of the formed groove and to compare the profile to maximum and minimum allowances. The tool point 152 is so small that it is difficult to obtain. However, the method of electrodeposition machining proves to be enabling.

Based upon the foregoing, now a vented tachometer roller which minimizes tape slippage can be provided which is reasonably manufacturable relatively defect-free, and which minimizes tape damage. Nevertheless, it will be appreciated that the above description pertains to only several embodiments of the present invention. That is, the description is provided by way of illustration and not by way of limitation. The invention, therefore, is to be defined according to the following claims.

What is claimed is:

1. A method for forming a tachometer roller for a tape drive assembly for detecting the speed of a tape streaming along a reference axis across the roller, the roller periphery having an axially extending center circumferential portion over which a data portion of the tape passes, the center circumferential portion being bounded by respective adjacent edge portions, the method comprising the step of forming an air vent groove on the roller center circumferential portion, the groove extending generally obliquely to the reference axis, and further comprising the steps of forming a first terminus of the groove on the roller center circumferential portion as a 360 degree circumferential groove at one of the respective edge portions and forming a second terminus of the groove on the roller center circumferential portion as a 360 degree circumferential groove at the other of the respective edge portions.

2. The method of claim 1 wherein the step of forming an air vent groove includes forming a helical thread groove on the center circumferential portion.

3. The method of claim 2 further comprising forming the air vent groove in a flanged roller.

* * * * *